(12) United States Patent
Watgen et al.

(10) Patent No.: US 7,609,367 B2
(45) Date of Patent: Oct. 27, 2009

(54) METHOD AND DEVICE FOR 3D IMAGING

(75) Inventors: Claude Watgen, Sandweiler (LU); Laurent Lamesch, Lamadelaine (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 10 days.

(21) Appl. No.: 12/066,318

(22) PCT Filed: Sep. 1, 2006

(86) PCT No.: PCT/EP2006/065927
§ 371 (c)(1),
(2), (4) Date: Mar. 10, 2008

(87) PCT Pub. No.: WO2007/028774
PCT Pub. Date: Mar. 15, 2007

(65) Prior Publication Data
US 2008/0239280 A1    Oct. 2, 2008

(30) Foreign Application Priority Data
Sep. 9, 2005 (EP) .................................. 05108303

(51) Int. Cl.
*G01C 3/08* (2006.01)
(52) U.S. Cl. ........................................................ 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS

| 5,194,906 A * | 3/1993 | Kimura et al. ............. 356/5.11 |
| 5,877,851 A * | 3/1999 | Stann et al. ................ 356/5.09 |
| 2002/0071109 A1 * | 6/2002 | Allen et al. ................ 356/5.01 |

FOREIGN PATENT DOCUMENTS

| DE | 197 04 496 | 3/1998 |
| EP | 0 527 585 | 2/1993 |
| EP | 1 152 261 | 11/2001 |

OTHER PUBLICATIONS

International Search Report; PCT/EP2006/065927; Nov. 15, 2006.

* cited by examiner

*Primary Examiner*—Thomas H Tarcza
*Assistant Examiner*—Luke D Ratcliffe
(74) *Attorney, Agent, or Firm*—Cantor Colburn LLP

(57) ABSTRACT

A method for 3D imaging of an actively illuminated target region includes emitting intensity-modulated light at a variable modulation frequency into the target region, the emitted light is scattered/reflected in the target region depending on the optical properties of the objects or beings present therein, a scattered and/or reflected fraction of the light is detected during an integration time interval by phase-sensitive integration in each pixel of an imaging sensor, the modulation phase between the emitted and the detected light is determined and spatially resolved, and distance information is calculated based on the spatially resolved modulation phase and an average frequency of the modulation frequency.

10 Claims, 1 Drawing Sheet

METHOD AND DEVICE FOR 3D IMAGING

TECHNICAL FIELD

The present invention generally relates to 3D imaging, more specifically to 3D imaging based on spatially resolved phase detection of modulated light waves.

BRIEF DISCUSSION OF RELATED ART

As opposed to conventional 2D imaging, a 3D imaging system requires depth information about the target scene, i.e. the distances between one or more observed objects and an optical receiver of the system need to be determined. The basic principles of three-dimensional imagers are described in detail in EP 1 152 261 A1 and WO 98/10255. 3D imaging systems of this kind use active illumination of the scene with intensity-modulated light. The scene is optically imaged onto a two-dimensional pixel array. Each pixel detects the modulation phase of the light that has been emitted by the illumination device and reflected or scattered from an object of the scene to the pixel. From this phase, the time lapsed between transmission and echo-return of the transmitted light and hence the distance the light has travelled can be determined for each pixel. These data can be used to generate a 3D representation of the scene. It should be noted that the term "light" is herein to be understood as including electromagnetic radiation in general and preferably visible, ultraviolet or infrared radiation.

Systems for creating a 3D representation of a given portion of space have a variety of potential applications in many different fields. Examples are automotive sensor technology (e.g. vehicle occupant detection and classification), robotic sensor technology (e.g. object identification) or safety engineering (e.g. plant monitoring) to name only a few.

Especially in the automotive field, electronics developers are increasingly faced with the problem of electromagnetic interference between different components of electronic car equipment. Developers therefore look for new solutions, which can help to reduce potential conflicts related to interference of electronic devices.

BRIEF SUMMARY OF THE INVENTION

The invention provides an improved method for 3D imaging of an actively illuminated scene.

The method for 3D imaging of an actively illuminated target region generally comprises emitting intensity-modulated light into the target region. The frequency of the modulation is hereinafter referred to as the modulation frequency. The emitted light is scattered and/or reflected in the target region depending on the optical properties of the objects or beings present therein. A scattered and/or reflected fraction of the light is detected during an integration time interval by phase-sensitive integration in each pixel of an imaging sensor. The modulation phase between the emitted and the detected light is then determined and spatially resolved. As will be appreciated, the modulation frequency is varied over the integration time interval, e.g. according to a predetermined pattern. According to the invention, distance information is calculated based on the spatially resolved modulation phase and an average frequency of said modulation frequency over said integration time interval. For each pixel, the distance from the light source to the scattering/reflecting object and can be calculated. Additionally or alternatively, the distance from the scattering object to the imager pixel or the total distance can be calculated. For each pixel, the total distance travelled by the light is determined as:

$$d = c \cdot \phi / (2\pi \cdot f),$$

where d is the total distance, c is the speed of light, $\phi$ is the modulation phase between the emitted and the detected light in radians and f is the average modulation frequency. When the light source is located next to the imaging sensor, the distance from the latter to the scattering/reflecting object corresponds to half the total distance d.

It will be appreciated that with variable modulation frequency, the modulation peak in the frequency domain is broader. A given energy content of the modulation is thus spread over a broader spectral range, which results in a lower peak and has beneficial impact on electromagnetic compatibility with electronic devices in the neighbourhood. The method furthermore allows more robust phase detection in presence of other illumination devices, which use modulation in the same frequency spectrum. Illumination devices with a fixed modulation frequency presently operate at approximately 20 MHz. In the present method, the modulation frequency could then be varied preferably in the range from 18 to 22 MHz, more preferably in the range from 19.5 to 20.5 MHz. IN a different embodiment, the modulation frequency could be varied preferably in the range from 28 to 32 MHz, and more preferably in the range from 29.5 to 30.5 MHz The modulation frequency can be varied continuously or in discrete steps. As a general rule, it can be said that the detection robustness increases with the width of the frequency range. On the other hand, a broader frequency range may induce a less precise distance determination. The above ranges represent a good compromise between these effects. Depending on the application, broader or narrower frequency ranges may nevertheless be appropriate.

The invention further relates to a 3D imaging system. Such a system comprises signal generation means for generating a modulation signal with a variable modulation frequency and an illumination unit operationally connected to the signal generation means for emitting intensity-modulated light with this modulation frequency into the target region. For detecting a scattered and/or reflected part of the light during an integration time interval and for determining a spatially resolved modulation phase between emitted light and detected light, an imaging sensor is provided, which is operationally connected to the signal generation means. The system further comprises an evaluation unit, which is operationally connected to the signal generation means and the imaging sensor for calculating distance information. It shall be noted that the signal generation means is configured so as to provide a modulation signal with a modulation frequency varying over the integration time interval. The evaluation unit further comprises a frequency average builder for providing an average frequency of the modulation frequency over the integration time interval, e.g. using the modulation signal as input. Alternatively, the signal generation means can be configured so that the average frequency takes a predetermined value. The average frequency thus needs not to be determined online but can be stored as a constant value in an internal memory of the system.

Advantageously, the signal generation means comprises a voltage-controlled oscillator (VCO), a numerically controlled oscillator (NCO) or a multiplexer, which can switch between different values of the modulation frequency. In the case of an NCO or a multiplexer, a controller can be provided for controlling the numerically controlled oscillator, respectively the multiplexer by a control signal. A frequency average builder operationally connected to the controller can then provide the average frequency of the modulation frequency based on the control signal.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION OF THE INVENTION

Figure 1:
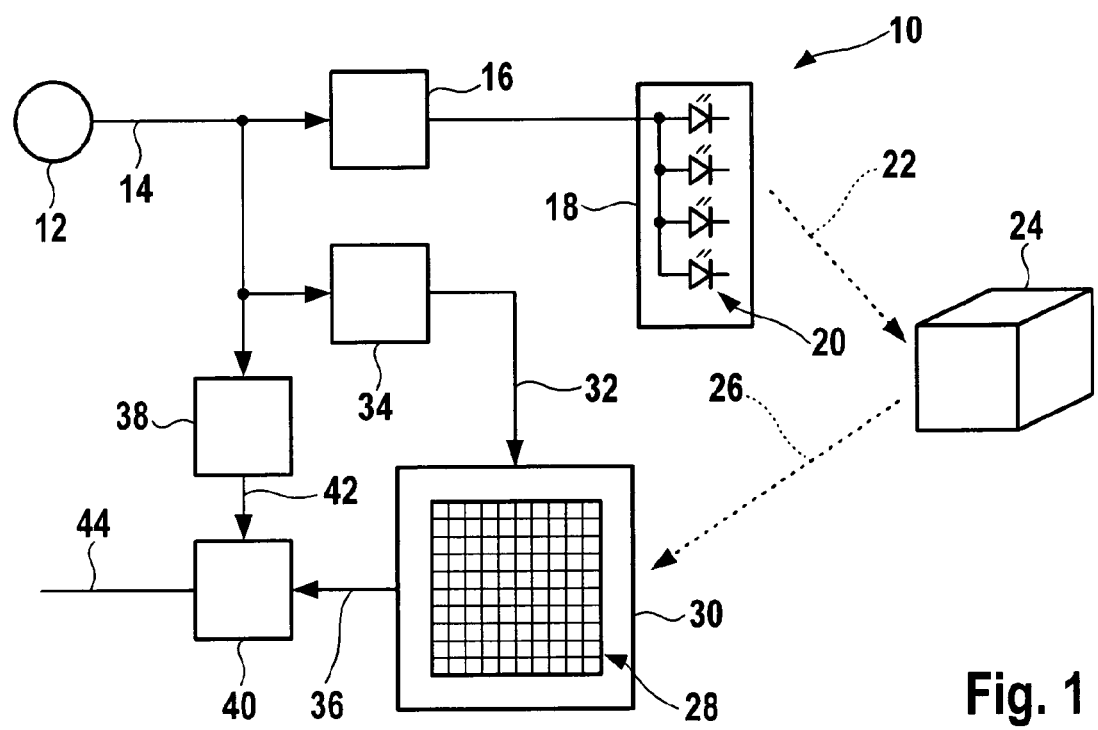
FIG. 1: is a block schematic diagram of a first embodiment of a 3D imager.

In the 3D imaging system 10 shown in FIG. 1, signal source 12 generates on its output a modulation signal 14 with a variable frequency. The signal source 1 is in this case a voltage-controlled oscillator (VCO) running at a carrier frequency and controlled by a defined signal that varies this frequency. The signal source 12 is connected to the illumination unit, which comprises an illumination driver 16 and a light source 18.

The illumination driver 16 amplifies the modulation signal 14 to drive the several individual light emitting devices 20 of the light source 18. The light source 18 emits an intensity-modulated light wave 22 into the target region, which contains an object 24 to be measured. Light is scattered or reflected on the surface of object 24 and a fraction 26 of the scattered/reflected light is directed onto the pixel array 28 of the three-dimensionally sensitive imager 30. The imager 30 (camera) is at the same time fed with a demodulation signal 32, which is derived from the modulation signal by the photo gate driver 34. The imager 30 outputs modulation phase information 36 for each pixel of the pixel array 28.

For each integration time interval of duration T, the frequency measurer and average builder 38 determines the average frequency of the modulation signal 14 by counting the cycles thereof. The average frequency f is calculated as f=N/T, where N is the number of cycles in the integration time interval. The average frequency is provided to a calculation unit 40 by connection line 42.

The calculation unit 40 calculates the distance d for each pixel with the phase information 36 and the average frequency f, according to the equation:

$$d = c \cdot \phi / (2\pi \cdot f),$$

where d is the total distance, c is the speed of light, $\phi$ is the modulation phase in radians between the emitted and the light detected in the respective pixel. The distance d is outputted at 44, from where it can be fed to other components, such as an image analyser or a microprocessor.

Figure 2:
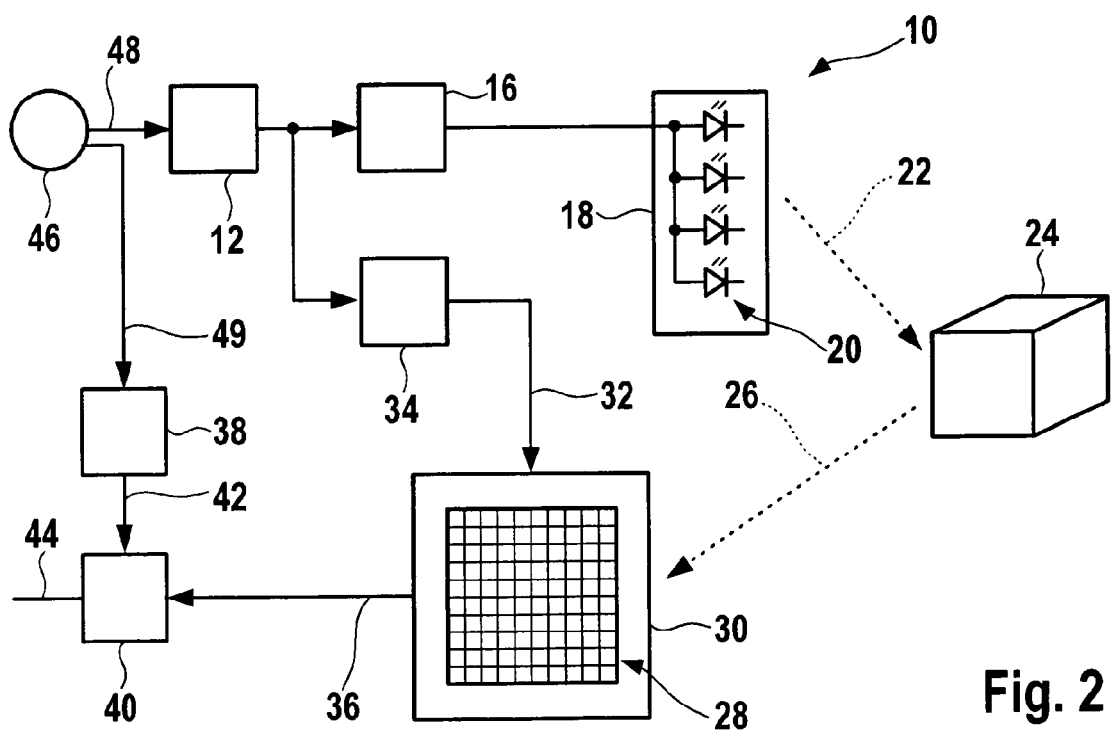
FIG. 2: is a block schematic diagram of a second embodiment of a 3D imager.

FIG. 2 shows a slightly different embodiment of a 3D imaging system 10. The signal source 12 that generates the modulation signal 14 with variable frequency is a numerically controlled oscillator (NCO) or a multiplexer switching between different frequency values operated by a controller 46 that defines the currently used frequency by means of control signal 48. The NCO or multiplexer is connected to the illumination unit, to which it provides the modulation signal 14. Illumination and modulation phase detection is performed in the same way as in the above-described embodiment.

The average frequency, however, is determined differently. The frequency average builder 38 is connected to the controller 46 and determines the different modulation frequencies of the modulation signal 14 outputted by the NCO or multiplexer based on the control signal 49. The frequency average builder 38 can, for instance, store the different values of the modulation frequency, which are identified by means of the control signal 49. If the time steps for the different modulation frequencies vary during the integration time, they are preferably also stored. At the end of each integration time interval, the average frequency is determined. In case there are n time steps of same duration, the average frequency f can be calculated according to:

$$f = (f1 + f2 + \ldots + fn)/n,$$

where f1, f2, ..., fn are the respective modulation frequencies during the n time steps.

In case the time steps have different duration, the average frequency f can be calculated as a weighed average of the frequencies of the individual time steps:

$$f = (a1 \cdot f1 + a2 \cdot f2 + \ldots + an \cdot fn)/(a1 + a2 + \ldots + an),$$

where f1, f2, ..., fn are the respective modulation frequencies during the n time steps and a1, a2, ..., an are weighting factors, e.g. corresponding to the respective durations of the individual time steps. The weighting factors can be normalised, i.e. multiplied by a common factor such that their sum equals 1, which simplifies the preceding equation.

The invention claimed is:

1. A method for 3D imaging of a target region using a 3D imaging sensor that includes an array of pixels, said method comprising:
    emitting light into said target region; said emitted light being intensity-modulated at a modulation frequency;
    detecting by phase-sensitive integration in each pixel a scattered and/or reflected part of said light during an integration time interval;
then determining for each pixel a modulation phase between emitted light and detected light; and
    varying said modulation frequency over said integration time interval; and
calculating distance information;
wherein
    said distance information is calculated, for each pixel, based on said modulation phase and an average frequency of said modulation frequency over said integration time interval.

2. A method according to claim 1, wherein said modulation frequency is continuously varied over said integration time interval.

3. A method according to claim 1, wherein said modulation frequency is varied in discrete steps over said integration time interval.

4. A method according to claim 3, wherein said discrete steps have equal duration and/or equal step height.

5. A 3D imaging system comprising:
    signal generation means for generating a modulation signal with a variable modulation frequency;
    an illumination unit operationally connected to said signal generation means for emitting intensity-modulated light with said modulation frequency into a target region;
    a 3D imaging sensor including an array of pixels, said 3D imaging sensor being operationally connected to said signal generation means for detecting, by phase-sensitive integration in each pixel, a scattered and/or reflected part of said light during an integration time interval and for then determining, for each pixel, a modulation phase between emitted light and detected light; and an evaluation unit operationally connected to said signal generation means and said imaging sensor for calculating distance information wherein said evaluation unit comprises a frequency average builder for providing an average frequency of said variable modulation frequency over said integration time interval, said distance information being calculated based on said modulation phase and said average frequency.

6. A 3D imaging system according to claim 5, wherein said signal generation means comprises a voltage-controlled oscillator.

7. A 3D imaging system according to claim 5, wherein said signal generation means comprises a multiplexer for switching between different values of said modulation frequency and a controller for controlling said multiplexer by a control signal.

8. A 3D imaging system according to claim 5, wherein said signal generation means comprises a numerically controlled oscillator and a controller for controlling said numerically controlled oscillator by a control signal.

9. A 3D imaging system according to claim 7, wherein said controller is operationally connected to said frequency average builder, said frequency average builder being able to provide said average frequency of said modulation frequency based on said control signal.

10. A 3D imaging system according to claim 8, wherein said controller is operationally connected to said frequency average builder, said frequency average builder being able to provide said average frequency of said modulation frequency based on said control signal.

* * * * *